United States Patent [19]
Brüschke et al.

[11] Patent Number: 5,512,179
[45] Date of Patent: Apr. 30, 1996

[54] MEMBRANE PROCESS FOR SEPARATION OF FLUID MIXTURES

[75] Inventors: Hartmut E. A. Brüschke, Nussloch; Walter H. Schneider, Schriesheim, both of Germany

[73] Assignee: Deutsche Carbone AG, Frankfurt, Germany

[21] Appl. No.: 407,217

[22] Filed: Mar. 20, 1995

[30] Foreign Application Priority Data

Mar. 24, 1994 [DE] Germany .................. 44 10 243.7

[51] Int. Cl.⁶ .................................................. B01D 6/36
[52] U.S. Cl. ................................... 210/640; 210/641
[58] Field of Search .................... 210/650, 640, 210/651, 641; 95/45, 52; 203/14, 18, 19

[56] References Cited

U.S. PATENT DOCUMENTS

| | | | |
|---|---|---|---|
| 3,608,610 | 9/1971 | Greatorex | 210/185 |
| 4,405,409 | 9/1983 | Tusel et al. | 203/19 |
| 4,895,989 | 1/1990 | Sander et al. | 95/52 |
| 4,962,270 | 10/1990 | Feimer et al. | 210/641 |
| 4,978,430 | 12/1990 | Nakagawa et al. | 210/640 |
| 5,030,356 | 7/1991 | Blume et al. | 210/640 |
| 5,151,190 | 9/1992 | Seiryo | 210/640 |
| 5,300,197 | 4/1994 | Mitani et al. | 210/640 |

FOREIGN PATENT DOCUMENTS

| | | | |
|---|---|---|---|
| 0147201 | 8/1985 | Japan | 210/640 |
| 3143923 | 6/1988 | Japan | 210/640 |
| 2194465 | 3/1988 | United Kingdom | 210/640 |

*Primary Examiner*—Frank Spear
*Attorney, Agent, or Firm*—Bardehle, Pagenberg, Dost, Altenburg, Frohwitter, Geissler & Partners

[57] ABSTRACT

A process for the separation of liquid component mixtures by combined pervaporation-vapor permeation with a feed flow in the form of a vapor-liquid mixture being employed and the feed flow being passed from bottom to top as a vapor-liquid mixture over a vertically arranged membrane, so that a permanent thorough mixing of vapor and liquid results, and no stationary liquid film is able to form on the surface of the membrane.

10 Claims, No Drawings

MEMBRANE PROCESS FOR SEPARATION OF FLUID MIXTURES

The present invention relates to a process for separation of fluid mixtures by means of pervaporation and vapor permeation.

Processes for the separation of fluid mixtures by means of pervaporation and vapor permeation are known to those skilled in the art. The fluid mixture to be separated, the feed flow, is brought into contact with the first side, the feed side, of a non-porous (pore-free) membrane, which has a preferred permeability for at least one of the components of the fluid mixture.

This component is transported through the membrane if a lower partial pressure of said component is provided by appropriate devices on the second side of the membrane, the permeate side, than on the feed side. Generally, the reduction of partial pressure on the permeate side occurs by applying a vacuum, with the permeate being obtained in a vaporous form and being sucked off or condensed, but other possibilities of maintaining a partial pressure gradient are known to those skilled in the art. Thus the (permeating) component, preferably transported through the membrane, is enriched on the permeate side and depleted in the feed flow. Membranes that allow water to preferably permeate, with organic components being retained, are known to those skilled in the art, as well as are such that allow organic components to permeate preferably, but retain water, as are such that allow certain organic classes of substances to permeate, preferably with others being retained. Consequently, organic solutions can be dehydrated by means of pervaporation and vapor permeation, organic components can also be removed from water and gas flows and organic mixtures can be separated as well.

It is further known, that the mass transfer through the membrane (flux) increases as the temperature increases; pervaporation and vapor permeation are thus performed at the highest temperatures possible, with a limitation given generally by the thermal stability of the membranes. Considering pervaporation, the feed flow is passed over the membrane in liquid phase, the temperature and the pressure thereof may be freely chosen, provided that the pressure is higher than the vapor pressure of the feed mixture. Thus there is a higher flexibility in the choice of operating conditions for pervaporation. Vaporization of the permeate requires the supply of the adequate heat of vaporization, which is withdrawn from the sensible heat of the liquid feed flow. Thus the temperature thereof is reduced as is the flux through the membrane. In pervaporation, the total surface of the membrane, being necessary for the respective task of separation, is known in the art to be divided into a number of subunits or steps. A heat exchanger is connected between two respective steps, the amount of heat, withdrawn from the feed flow by vaporization of the permeate, is reintroduced into the feed flow before it enters the next step or subunit. A disadvantage of this procedure is that a number of heat exchangers and steps are arranged through which the feed flows in series, requiring higher costs for components and piping. Additionally, only a part of the membrane area is operated at the optimal temperature, the remaining part always at a lower temperature. Advantageous though, is that only the amount of heat actually needed for vaporization of the permeate has to be supplied.

In vapor permeation the total feed is vaporized in a preceding vaporizer and passed over the membrane in the vapor phase. No additional heat has to be withdrawn from the system for the penetration of the permeate, the change of temperature caused by the Joule-Thompson effect disregarded. The total membrane area is operated at a constant temperature and thus at maximal flux, no division into steps is necessary. This leads to an improved utilization of the membrane area and a simplification of the arrangement. Disadvantageous, however, in vapor permeation is the need of the total feed flow to be vaporized first and condensed again after, thus increasing distinctively the energy consumption as compared to pervaporation because of the restricted heat recovery in the condensation. Further, it is known to those skilled in the art, that the vapor has to be passed over the membrane at saturation conditions. Any superheating of the vapor leads to a strong reduction of activity and thus of the driving force for the transport through the membrane. Owing to the concentration change of the feed along the membrane, the saturation conditions (boiling temperature and vapor pressure) change so that saturated vapor conditions can only be maintained by means of costly compression, heating, or cooling. This can cause a total loss of the cost advantage that vapor permeation first gains over pervaporation. There has been no lack of attempts to unite the advantages of both methods while avoiding their drawbacks. So it has been suggested in U.S. Pat No. 5,151,190 to reheat the retentate of membrane step and to recirculate part of it to the feed flow, thus increasing by means of this recirculation the supplied amount of heat and thereby the average temperature of the feed flow between entry and outlet of a membrane step. This procedure doesn't really succeed, however, if a certain final concentration of the retentate has to be achieved, because then a high number of steps with interconnected heat exchangers is required and the redilution causes a lower degree of efficiency of the membrane area than can be achieved in a pervaporation process.

In U.S. 4,405,409 it has been suggested to use the waste heat of a preceding distillation column as a heat source for pervaporation. The exhaust vapor of the distillation column heats conventional heat exchangers between the single membrane steps. It has been suggested for the dehydration of ethanol to feed back into the first membrane step, connected after predistillation, a portion of the retentate of this membrane step in order to increase the operation temperature of this first step. An essential disadvantage of this procedure is that the operation temperature of pervaporation is linked to that of the distillation column and can not be freely chosen.

In DE 34 10 155 it has also been suggested to use the exhaust vapor of a preceding distillation column as an energy source for pervaporation. Here the heat exchangers heated by the exhaust vapor are integrated into the membrane steps. A feed compartment is proposed, one wall of which is formed by the feed side of the membrane, and in which the feed flow is heated by another wall, serving as a heat exchange area. A device that is appropriate for this process is described in EP 118 760, with an electrical heating being disclosed. A similar suggestion is found in U.S. Pat. No, 3,608, 610, with the permeate side of the membrane being heated. As on one hand the integration of a heat exchange area causes considerable problems in sealing, and on the other hand an electrical heating cannot be performed with inflammable media because of safety reasons, none of those devices has been realized to date in practice. In EP 294 827 it has been suggested to film a liquid film of 0.1 to 10 mm in thickness from the feed flow on the feed side of the membrane and to heat it by means of contact with vaporous feed flow. The vaporous and the liquid portion of the feed mixture can be directed as cocurrent, cross, or counter current flow. It is an essential feature of EP 294 827 that the vaporous form of the/bed flow is totally condensed after leaving a membrane step and supplied as a liquid to the same step in order to form the indispensable liquid film on the membrane. It turned out that there is no advantage of the EP 294 827 teaching as compared to pervaporation or vapor permeation alone. The membrane is only in contact with a completely formed liquid film, which on the other side is in contact with a vapor phase. Indeed, substance can condense from the vapor phase into the liquid film, but it has to be transported through it. The same applies to the heat that is brought into the liquid film from the vapor. The completely formed liquid film is an additional resistance to mass transfer as well as to heat transport. If more than one membrane step is required for achieving a specified final concentration, the retentate of the first step has to be vaporized again, directed through the next step and condensed again, in order to form said liquid film, causing a distinct additional consumption of energy thereby. Surprisingly, it has been shown that the described disadvantages, known in the art, can be avoided and the respective advantages of pervaporation and vapor permeation can be unified. The present invention relates thus to a combination of the processes of vapor permeation and pervaporation for the separation of fluid mixtures and particularly to a combination of vapor pemeation and pervaporation for the removal of at least one undesired minor component from a feed flow as described in claim 1. Essential features of the present invention are that the membrane is arranged in such a manner, that the feed mixture forming the feed flow flows from the bottom to the top along the feed side of the membrane, with the membrane being arranged vertically, no stationary liquid film forms on the membrane, the feed mixture is passed over the membrane as a vapor-liquid mixture whereby the ratio between vapor to liquid phase can freely be chosen in a wide range, vapor and liquid are in a thermodynamical equilibrium caused by permanent mixing of tile two phases, thus the vapor is always at saturation conditions, by permanent mixing of vapor and liquid, any liquid film forming on the feed side of the membrane is constantly destroyed, thus minimizing the transition resistance on the feed side of the membrane, and no stationary liquid film on the membrane can be formed. Devices (modules), appropriate for the performance of the process according to the present invention are described e.g. in DE 4 225 060 or in EP 0 214 496; both devices allow for the vertical arrangement of the membrane.

In a preferred embodiment the feed flow to be separated, the feed mixture, is preheated to the desired operating temperature, e.g. 95° C., in liquid phase. Then it is directed to a vaporizer, which is heated by vapor, heat transfer liquid, or electrically, with the heating power being fixed by means of appropriate control devices. By the fixed heating power, the mass of the feed flow, and its evaporation enthalpy, the ratio of vapor to liquid at the outlet of the vaporizer is fixed and can be controlled. The pressure is regulated in such a manner that its value corresponds to the boiling temperature in the vaporizer.

In a further preferred embodiment, the heating power of the vaporizer is fixed in such a manner, that the molar portion of vapor in the feed flow to the module containing the membrane corresponds to 90% to 150% of the molar permeate flow.

In another preferred embodiment, the retentate received at the outlet of the module is directed in liquid form to another module being operated by a pervaporation process.

In a further preferred embodiment, one part of the feed mixture is being split off after the heat exchanger and is directed as a liquid into the module through a first line. The second part of the feed mixture is vaporized completely in the vaporizer and is directed into the module through a second line so that vapor is directed into the module, which is filled with liquid.

In a further preferred embodiment, one part of the feed flow is vaporized completely in the vaporizer and passed into the module as vapor. The second part of the feed mixture is split off after the heat exchanger, and directed into the module through a separate line and by an additional pump, so that a fine dispersion of liquid particles in the vapor phase is formed, In a further preferred embodiment, the feed flow vapor and liquid portions are passed through several membrane modules.

the following examples and comparative examples illustrate the process of the present invention as compared to vapor permeation and to pervaporation alone.

Comparative example 1

A plate module, as described e.g. in DE 4 225 060, is loaded with a commercially available pervaporation membrane (PERVAP®1000 of GFT), the membrane area being 1 m². The membrane is arranged horizontally in the module. On the permeate side of the module a vacuum of 3 mbar is applied, the resulting permeate being condensed at 0° C. A feed mixture of 93.8% by weight ethanol and 6.2% by weight water is heated to 95° C. and passed through the module, on the retentate side of the module a pressure of 2.2 bar absolute being maintained. With a feed flow of 5 kg/h a product of 4.78 kg/h having a water content of 2.12% by weight and a temperature of 71° C. is obtained.

Comparative example 2

The arrangement according to example 1 is varied in such a manner, that the feed mixture, heated in advance to 95° C. is directed to an electrically heated vaporizer and completely vaporized. The membrane is arranged vertically in the module, the vapor flow is directed from top to bottom through the module. On the relentate side of the module a pressure of 1.9 bar absolute is maintained, corresponding to a vapor temperature of 94° C. In a condenser the vaporous retentate is completely condensed. For an amount of feed of 5 kg/h the vaporizer needs a heating power of 1.35 kW, after the condensation 4.71 kg/h of product, having a water content of 0.63% by weight, is obtained. The utilization of the membrane area is clearly better than in comparative example 1, as is shown by the lower water concentration of the retentate.

Example 1

The proceeding is akin to comparative example 2, the membrane being vertically arranged in the module. A heating power of only 0.25 kW is supplied to the vaporizer. The feed mixture is directed from bottom to top through the module, at the outlet of the module a liquid, containing only very few bubbles of vapor, having a temperature of 95° C. and a water content of 0.51% by weight is obtained. As compared to comparative example 2 the utilization of the membrane is even improved, as the low water content of the retentate shows, but less than ⅕ of the heat needed in comparative example 2 is required.

Comparative Example 3

The same arrangement as in comparative example 1 is used, except for the module being loaded with a commercial high flux membrane of also 1 m² membrane area. The feed mixture consists of 87% by weight propanol-2 and of 13% water. It is also heated to 95° C. and directed into the module in liquid form, the pressure at the outlet of the module being 2 bar absolute. With an amount of feed of 10 kg/h, a product of 93.6% by weight propanol-2 and 6.4% by weight water is obtained at a temperature of 52° C.

Comparative example 4

The proceeding is akin to comparative example 2, except that the high flux membrane and a propanol-2-water mixture of comparative example 3 is used. A heating power of 2.5 kW has to be supplied to the vaporizer to completely vaporize the feed mixture of 10 kg/h of 87% by weight propanol-2 and 13% water, which has been preheated to 95° C. After condensation, a product of 8.58 kg with a water content of 0.6% by weight is obtained. As compared to tile comparative examples 1 and 2 clearly better utilization of the membrane is achieved, as can be seen by the lower water content of the retentate as compared to comparative example 3.

Example 2

The mixture of comparative example 4 is treated according to comparative example 2, with a heating power of 0.45 kW being supplied to the vaporizer to only partly vaporize the feed mixture, and the feed flow is directed from bottom to top over the vertically arranged membrane. The liquid retentate at the retentate side of the module consists of 99.7% by weight propanol-2 and of 0.3% by weight water at a temperature of 94° C. Here as well, an improved utilization of the membrane as compared to comparative examples 3 and 4 is also achieved: the additional expense of heat is less than ⅕ of that being required in comparative example 4.

Example 3

The fluid retentate being obtained in example 2 is passed directly into a module with horizontally arranged membranes, containing an area of 1 m² of the same membrane as in comparative examples 3 and 4 and as in example 2. At the outlet of this second module a retentate is obtained, having a water content of 0.04% by weight and a temperature of 74° C.

Comparative example 5

The product obtained in comparative example 3 was heated again to 95° C. and was passed again through a module with an area of 1 m² of the same membrane and arrangement in order to obtain the same final water content as in example 3. The water concentration of the retentate was still 1.7% by weight at the outlet of the second module, only after a third module a final water content of the retentate of 0.04% by weight, corresponding to that of example 3 was obtained. A heating power of a total 0.48 kW was required for the reheating between the first and the second and the second and the third module. As compared to example 3 the same water concentration is obtained in the last retentate, and the heat being supplied is almost the same, but 3 m² Of membrane area are required as compared to 2 m² in example 3.

It is evident to anyone skilled in the art that the examples being noted herein for dehydration processes may be employed equivalently for the separation of other mixtures like organic-organic mixtures.

We claim:

1. A process for separation of fluid mixtures by means of a combined pervaporation-vapor permeation process comprising:

passing a feed flow over a vertically arranged membrane from bottom to top as a vapor-liquid mixture, so that a permanent thorough mixing of vapor and liquid results, and no stationary liquid film is able to form on the surface of the membrane; and recovering a component of the feed flow in a permeate flow on an opposite side of the membrane from said feed flow.

2. The process according to claim 1, wherein a molar vapor ratio between the feed flow and the permeate flow is from about 90% to about 150%.

3. The process according to claim 1, further comprising separating the feed flow into a vapor portion and a liquid portion and passing the portions through separate lines into a module containing the membrane.

4. The process according to claim 1, wherein said feed flow is employed at a temperature higher than its atmospheric boiling point.

5. The process according to claim 1, further comprising separating a retentate flow obtained after passing said feed flow over the membrane, in another membrane module by a pervaporation process.

6. The process according to claim 1, further comprising passing a retentate flow obtained after passing said feed flow over the membrane through several membrane modules.

7. The process according to claim 1, wherein water is separated from the feed flow.

8. The process according to claim 1, further comprising passing said permeate flow through another membrane module.

9. The process according to claim 1, wherein one or more organic components are separated from the feed flow.

10. A process for separation of fluid mixtures by means of a combined pervaporation-vapor permeation process comprising:

separating the feed flow into a vapor portion and a liquid portion and passing the portions through separate lines into a module containing a membrane;

passing the vapor portion and the liquid portion of the feed flow over a vertically arranged membrane from bottom to top as a vapor-liquid mixture, so that a permanent thorough mixing of vapor and liquid results, and no stationary liquid film is able to form on the surface of the membrane; and recovering a component of the feed flow in a permeate flow on an opposite side of the membrane from said feed flow.

\* \* \* \* \*

UNITED STATES PATENT AND TRADEMARK OFFICE
CERTIFICATE OF CORRECTION

PATENT NO. : 5,512,179
DATED : April 30, 1996
INVENTOR(S) : Hartmut E.A. Bruschke et al.

It is certified that error appears in the above-indentified patent and that said Letters Patent is hereby corrected as shown below:

In column 2, line 59, replace "inflammable" with --flammable--.

In column 2, line 61, replace "to film a liquid film" with --to form a liquid film--.

In column 2, line 67, replace "the/bed flow" with --the feed flow--.

In column 3, line 36, replace "tile" with --the--.

In column 3, line 61, replace "corresponds to 90% to 150%," with --corresponds from 90% to 150%--.

In column 4, line 16, replace "the following examples" with --The following examples--.

UNITED STATES PATENT AND TRADEMARK OFFICE
CERTIFICATE OF CORRECTION

PATENT NO. : 5,512,179

DATED : April 30, 1996

INVENTOR(S) : Hartmut E.A. Bruschke et al.

It is certified that error appears in the above-indentified patent and that said Letters Patent is hereby corrected as shown below:

In column 4, line 44, replace "relentate" with --retentate--.

In column 5, line 6, replace "heated to 95° C. and directed" with --heated to 95° C and directed--.

In column 5, line 21, replace "tile" with --the--.

In column 6, line 2, replace "$3m^2$ Of" with --$3m^2$ of--.

Signed and Sealed this

Seventeenth Day of December, 1996

Attest:

BRUCE LEHMAN

*Attesting Officer*    *Commissioner of Patents and Trademarks*